Jan. 10, 1950 J. B. CLAPP 2,494,285
ARMOR FOR OVERHEAD CABLE MOUNTINGS
Filed Dec. 14, 1945
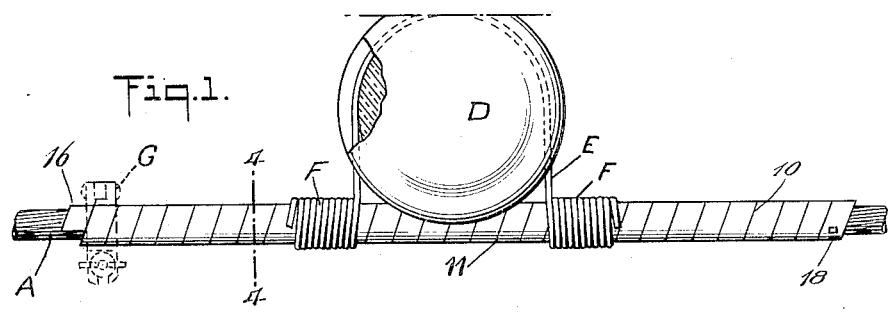
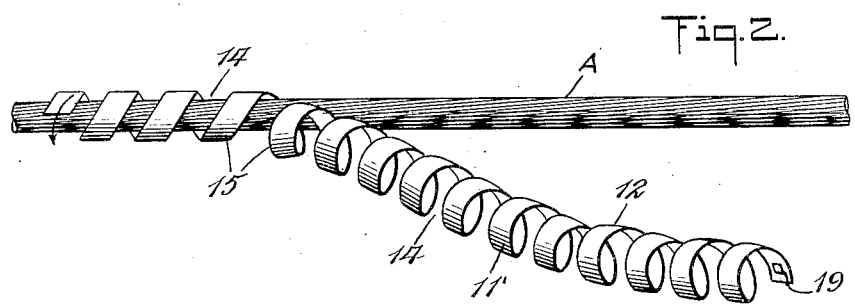
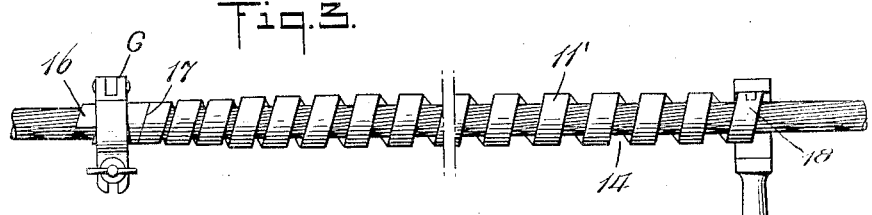
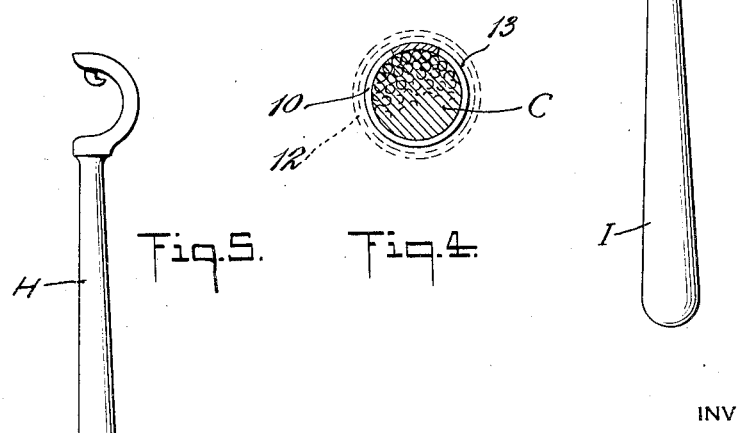
INVENTOR
JEROME B. CLAPP
BY
*Warren S. Orton.*
ATTORNEY Patented Jan. 10, 1950

2,494,285

UNITED STATES PATENT OFFICE 2,494,285

ARMOR FOR OVERHEAD CABLE MOUNTINGS

Jerome B. Clapp, North Plainfield, N. J., assignor to The Thomas & Betts Co., Elizabeth, N. J., a corporation of New Jersey Application December 14, 1945, Serial No. 635,062

3 Claims. (Cl. 174—42)

The invention relates to an improved technique in applying a cable protection to a cable or overhead conductor, such as a telegraph, telephone, or power transmission cable or conductor.

Such cables must be suspended at spaced apart intervals to mounting insulators and the usual practice is to tie the cable to its mountings by different forms of tying or clamping means. Under present practices serious objections have developed to the mounting of cables now in general use. For instance, serious excessive wear develops due to burning or chafing of both the conductor and its tie wire; both the conductor and the tie wires develop vibration fatigue; arcing from conductor to ground is very apt to occur; and the pitting of conductor insulation due to lightning strikes are quite apt to develop weaknesses in the cable resulting eventually in tensile breaks.

In an effort to protect the cable at the tying points, different forms of armouring devices have been suggested. For instance it has been suggested to clamp a group of wires arranged in parallel relation to the portion of the cable at its point of suspension, but the group is difficult to keep in place while being installed and necessitates the use of clamps. The wires eventually become loose and drop away. It has also been suggested to wind a wire sometimes a flat strip of metal tightly about the cable. This method however involves the use of hot line tools including expensive holding and twisting dies; and is a slow, tedious overhead process.

The primary object of this invention is to provide an extremely simplified form of cable armour which will avoid all of the above noted objections to present practices and devices and which will provide a positive protection to the cable at the point where it is suspended from its supporting insulators.

A further object is to provide a cable protection preformed as a cylindrical helical strip and which can be supplied in a few standard stock sizes so as to fit any of the usual size cables; which can be formed easily of a relatively small amount of ribbon-like metal or plastic material, thus featuring economy in manufacturing costs and which can be located in place and locked securely to the cable by a single lineman in a few minutes time and without necessity of carting and using cumbersome equipment to effect the installation and without necessity of using other fastening means.

Broadly, the invention features the providing of a wide, thin strip of a ductile material such as aluminum alloy supplied from stock in a preformed open helical design and somewhat oversized compared to the size of the cable on which it is to be used and fashioned so that it can be wound down easily on to the cable at the point of attachment. This method of application involves temporarily clamping one end of the helix to the cable, and by applying a turning tool to the other end, the helix can be wrapped down with a force to bend the material beyond its elastic limits and into snug winding engagement with the cable, permanently reducing its internal bore to provide a custom fit on the associated cable irrespective as to its diameter and thus to secure the cable protection in place avoiding necessity of using the usual end clamps or other separate fastening means.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

In the accompanying drawings:

Fig. 1 is a plan view looking down upon a cable at one of its insulator mountings and showing a coiled armouring tube construction constituting a preferred finished embodiment of the invention located in operative position on the cable;

Fig. 2 is a view in side elevation of the stock oversized helical as it is partially wrapped on to the cable and illustrating the first step in mounting the device in position;

Fig. 3 is a similar view showing the helix of Fig. 2 anchored in position at one end, with some of the coils at the left end of the showing in contact and illustrating a succeeding step in mounting the device in position and prior to the complete wrap down shown in Fig. 1;

Fig. 4 is a transverse sectional view taken on the line 4—4 of Fig. 1, and also showing in ghost outline a transverse sectional view of the device when located on the cable and before it is wrapped down as herein featured; and Figure 5 is a view in side elevation of the tool end of a winding spanner shown in operative position in Figure 4.

In the drawings there is shown a conventional form of cable A of the stranded type including conductors C. The cable is suspended from a glass insulator D and secured thereto by tie wires E following conventional practices in this respect. As shown in Fig. 1 there is located between the windings F forming the ends of the tie wire and the cable A, an armouring tube 10 particularly forming the novel aspect of this disclosure. The tube 10 is formed of a single length of material initially of open helical form with a plurality of closed turns 11 and wrapped down on the cable A in situ and thus snugly adhering to the cable by reason of the gripping action of the tube.

The tubes are formed initially of measured lengths of long, narrow, flat ribbon-like strips of extremely thin sheet metal and in the instant case are cut from thin sheets of commercial aluminum or an alloy thereof. Of course these tubes might be formed of sheet copper, or any equivalent metal such as silver, nickel or any alloy thereof or even of a suitable plastic material molded to shape, it simply being necessary that the metal or plastic be of low ductility and thus capable of retaining its shape when forcefully wrapped down as hereinafter described. Preferably but not necessarily the material should be of high conductivity. The strips so cut are wound and preformed usually under heat, about a mandrel as a factory practice into the form of an open slightly flexible helix 12 shown in Fig. 2. In this preforming operation the diameter of the helix is formed somewhat oversized compared to the diameter of the cable or conductor which it is intended to protect, as shown by the dash and full lines 12 of Fig. 4, thus to provide a clearance 13 therebetween. The openings or spaces 14 between succeeding open turns 11' of the initial spiral are sufficiently large, that is the turns are spaced apart distances not less than the diameter of the cable A, to permit the cable to extend therethrough as between the adjacent turns 15 shown in Fig. 2 as the spiral is bent slightly out of line in the act of winding the helix on to the cable.

One end such as the left end 16 of the helix, hereinafter sometimes called the advanced end, is first hooked over the cable and by rotating the same in the proper direction as indicated by the curved arrow at the left end in Fig. 2, the helix 12 is rotated about its own axis until the entire length of the helix loosely encircles the cable as suggested at the left of Fig. 2. The helix when fully on the cable may then be shifted bodily in an axial direction until one end, such as the left end 16, is at that proper distance from the insulator D which such end will assume in the completed tube 10 as shown in Fig. 1.

The first applied end turn 16 is then clamped down in a tight circle on the cable by some form of easily separable jaw clamping tool such as is indicated at G. This circularly tightening has the effect of causing the end turn 16, sometimes hereinafter referred to as the anchored turn, to curl and thus become distorted into a firm binding engagement with the cable A.

The turn 18 at the other, right or free end of the cable is provided with an aperture 19 designed to be engaged by a tooth of a spanner, or other suitable form of turn-tool H as shown in Fig. 3. When the spanner is hooked into the aperture 19 in the free end turn 18 as shown at the right of Fig. 3, the lineman then grasps the long handle I of the spanner H and rotates the spanner and with it the end turn 18, time after time about the axis of the cable A, until all of the originally open turns 11' finally come into snug flat edge-to-edge abutting relation to form the closed joint 17 between the adjacent turns 10 as shown on the left of Fig. 3. This winddown is affected first at the left anchored end of the device as shown in Fig. 3, and then the turn down occurs progressively along the entire length of the helix until the tube 10 as shown in Fig. 1 is formed. It is obviously within the scope of the disclosure to wind simultaneously the opposite ends of the helix in relatively reversed clockwise motions and in this case the clamping tool G is unnecessary and its place is taken by a winding tool corresponding to the spanner H.

The winding action is sufficiently powerful to provide a turning force beyond the elastic limit of the metal or other material of which the helix is formed and the turning is of sufficient time duration to permit the metal or other material to settle permanently into its new constricted configuration. While the manual operation is preferable from the standpoint of economy in installation, it is of course within the scope of the disclosure to utilize any of the wire winding or twisting machines now in general use and the use of such machines is indicated where some particular condition indicates a necessity for using a coil of greater thickness of material than is herein indicated as sufficient.

The result of this rotation of the tool H, manually or mechanically, is to cause the several open helical turns 11' to wrap down firmly on the cable, which thus functions as a mandrel, beginning with the constriction of the first or anchoring turn 16 at the left and progressing successively in turning down each turn to the last or free end turn 18 at the right. As the spiral is made of rather thin stock material the lineman has no particular difficulty in wrapping down the turns especially as the tool handle I may be made sufficiently long to provide a leverage to provide the necessary mechanical advantage. During this wrapping down operation the original open helix 12 becomes permanently set incidentally reducing its bore to that of the cable at least slightly compressed thereby and reducing in length so that the resulting tube 10 is much less than the helix 12, is continuous and is in effect solid from end to end, so that no part of the protected cable is exposed and infiltration of dirt or ice through the closed joint 17 is avoided.

At the end of the winding operation the tools G and H are removed and the armouring operation is complete. It is a feature of this disclosure that the armouring tube is fixed permanently in place without necessity of using any fastening means. Finally the tie wire windings F are then wrapped snugly about the tube 10 and the tie wires E are looped about and secured to the insulator following conventional practices in this respect.

It is seen from this description that the original open helix 12 when wound on to the cable has its anchored end turn 16 constricted by the tool G into a permanent clamping engagement with the portion of the cable encircled thereby, and that the spanner H as it rotates forcefully winds down the several turns in order from left to right to form eventually a solid tube 10 shrunk on to the cable A without necessity of demounting the cable from its several supporting insulators D. The tube 10 adheres to the cable solely by reason of its frictional engagement therewith developed as the result of the set of the metal or plastics in turn imposed thereon by the winding operation. As the turns are in firm abutting relation the tube is in effect solid from end to end and thus all parts of the cable inclosed thereby are fully protected so long as the armour is in place. Should it be decided to remove the armouring tube it is simply necessary to reverse the operation and by means of a suitable tool to wrap out the coils towards their original open structure as shown in Fig. 2 and then the resulting helix can be twisted off the cable.

I claim:

1. A stock unit for use in armouring an electric cable, comprising a wide, thin strip of metal in open helical form with its adjacent turns separated material distances apart, said strip being preformed and substantially free of internal stresses or capacity to contract automatically, being sufficiently rigid to maintain its configuration when free of distorting forces and having said helical strip being sufficiently flexible to permit of its being bent from its initial configuration transversely of its length in the act of winding it on to a cable, said metal having such ductility as will permit a reduction of the diameter in the turns under rotative twist and thus permit the helical strip to be wrapped down firmly on to the cable with the edges of the turns in snug abutting relation and thus capable of being distorted radially beyond its elastic limits to form a permanently deformed and substantially solid tube of less diameter than the helical strip, when one end of the unit is anchored to the cable and its other end forcefully turned in the direction of its turns with a force sufficient to wind down the turns on the cable in permanent binding engagement therewith.

2. The helical stock unit defined in claim 1 and in which the turn at one end of the helix provides a curved surface fashioned for engagement by a clamp for deforming such turn into a squeeze binding engagement with the cable to be armoured and with the turn forming the other end of the helix provided with means fashioned to be engaged by a winding tool for winding the helical strip on to the cable.

3. In a device of the class described, the combination of a conductor, a preformed wide, thin strip of ductile metal of helical form wound on the conductor, said strip fashioned to receive a clamping tool engaging the turn of the helix at one end thereof for clamping said end turn in firm binding engagement with the conductor, the turn forming the opposite end of the spiral being of greater diameter than the conductor and provided with an aperture extending therethrough for receiving a spanner provided with means engaging in the aperture and functioning when the helix is rotated thereby in the direction of the turns of the helix to wrap the helix down into a fixed binding engagement with the conductor.

JEROME B. CLAPP.

REFERENCES CITED

The following references are of record in the file of this patent:

UNITED STATES PATENTS

| Number | Name | Date |
| --- | --- | --- |
| 749,867 | Kline | Jan. 19, 1904 |
| 2,274,833 | Hubbard | Mar. 3, 1942 |
| 2,275,019 | Peterson | Mar. 3, 1942 |

FOREIGN PATENTS

| Number | Country | Date |
| --- | --- | --- |
| 340,962 | Italy | June 2, 1936 |
| 366,377 | Germany | Jan. 8, 1923 |